US007697443B2

(12) United States Patent
Archer et al.

(10) Patent No.: US 7,697,443 B2
(45) Date of Patent: Apr. 13, 2010

(54) LOCATING HARDWARE FAULTS IN A PARALLEL COMPUTER

(75) Inventors: Charles J. Archer, Rochester, MN (US); Mark G. Megerian, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 11/279,592

(22) Filed: Apr. 13, 2006

(65) Prior Publication Data

US 2007/0242685 A1 Oct. 18, 2007

(51) Int. Cl.
*H04L 12/26* (2006.01)
*G06F 15/173* (2006.01)
*G06F 15/16* (2006.01)
*G06F 11/00* (2006.01)

(52) U.S. Cl. ............... 370/242; 370/408; 709/224; 709/252; 714/27

(58) Field of Classification Search ......... 370/242–245, 370/248, 408; 709/212, 213, 252, 224
See application file for complete search history.

(56) References Cited

U.S. PATENT DOCUMENTS

| | | | |
|---|---|---|---|
| 4,245,344 A | | 1/1981 | Richter |
| 4,634,110 A | * | 1/1987 | Julich et al. ............ 714/11 |
| 4,860,201 A | * | 8/1989 | Stolfo et al. ........... 712/11 |
| 5,333,268 A | * | 7/1994 | Douglas et al. ......... 709/244 |
| 6,047,122 A | * | 4/2000 | Spiller .................. 718/108 |
| 6,449,667 B1 | * | 9/2002 | Ganmukhi et al. ........ 710/28 |
| 6,813,240 B1 | | 11/2004 | Shah |
| 6,880,100 B2 | | 4/2005 | Mora et al. |
| 6,912,196 B1 | | 6/2005 | Mahalingaiah |
| 7,200,118 B2 | | 4/2007 | Bender et al. |
| 7,210,088 B2 | * | 4/2007 | Chen et al. ............. 714/746 |
| 2002/0152432 A1 | | 10/2002 | Fleming |
| 2004/0078493 A1 | * | 4/2004 | Blumrich et al. ........ 709/250 |

(Continued)

OTHER PUBLICATIONS

N R Adiga et al., "An Overview of the BlueGene/L Supercomputer," Supercomputing, ACM/IEEE 2002 Conference, Nov. 16-22, 2002, Piscataway, NJ.
Office Action Dated Nov. 12, 2008 in U.S. Appl. No. 11/279,573.
Office Action Dated Apr. 15, 2009 in U.S. Appl. No. 11/279,573.

(Continued)

*Primary Examiner*—Alpus H Hsu
*Assistant Examiner*—Jeremy Costin
(74) *Attorney, Agent, or Firm*—Biggers & Ohanian, LLP

(57) ABSTRACT

Locating hardware faults in a parallel computer, including defining within a tree network of the parallel computer two or more sets of non-overlapping test levels of compute nodes of the network that together include all the data communications links of the network, each non-overlapping test level comprising two or more adjacent tiers of the tree; defining test cells within each non-overlapping test level, each test cell comprising a subtree of the tree including a subtree root compute node and all descendant compute nodes of the subtree root compute node within a non-overlapping test level; performing, separately on each set of non-overlapping test levels, an uplink test on all test cells in a set of non-overlapping test levels; and performing, separately from the uplink tests and separately on each set of non-overlapping test levels, a downlink test on all test cells in a set of non-overlapping test levels.

18 Claims, 7 Drawing Sheets

U.S. PATENT DOCUMENTS

2004/0103218 A1   5/2004   Blumrich et al.
2004/0223463 A1*  11/2004  MacKiewich et al. ....... 370/256
2005/0131865 A1   6/2005   Jones et al.
2005/0246569 A1*  11/2005  Ballew et al. .................. 714/4
2006/0179269 A1*  8/2006   Archer et al. .................. 712/11
2007/0174558 A1   7/2007   Jia et al.
2008/0270998 A1   10/2008  Zambrana

OTHER PUBLICATIONS

Office Action Dated Nov. 12, 2008 in U.S. Appl. No. 11/279,579.
Office Action Dated Apr. 15, 2009 in U.S. Appl. No. 11/279,579.
Office Action Dated Jan. 9, 2009 in U.S. Appl. No. 11/279,586.
Office Action Dated Nov. 18, 2008 in U.S. Appl. No. 11/279,592.
Office Action Dated Apr. 29, 2009 in U.S. Appl. No. 11/279,592.

* cited by examiner

LOCATING HARDWARE FAULTS IN A PARALLEL COMPUTER

GOVERNMENT RIGHTS IN INVENTION

The U.S. Government has a paid-up license in this invention and the right to limited circumstances to require the patent owner to license others on reasonable terms as provided for by the terms of Contract No. B519700 awarded by the Department of Energy.

BACKGROUND OF THE INVENTION

1. Field of the Invention

The field of the invention is data processing, or, more specifically, methods, apparatus, and products for locating hardware faults in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh', for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point geometrically aware diagnostics, but a tree network typically is inefficient in point to point communication. A tree network, however, does provide high bandwidth and low latency for certain collective operations, message passing operations where all compute nodes participate simultaneously. Because thousands of nodes may participate in data processing operations on a parallel computer, locating hardware faults in a parallel computer is difficult.

SUMMARY OF THE INVENTION

Methods, apparatus, and computer program products are disclosed for locating hardware faults in a parallel computer. Such a parallel computer includes a plurality of compute nodes and a data communications network. The data communications network includes data communications links connected to the compute nodes so as to organize the compute nodes as a tree. The tree is characterized by a root compute node and a plurality of tiers of compute nodes. Locating hardware faults according to embodiments of the present invention typically includes defining within the tree two or more sets of non-overlapping test levels of compute nodes of the network that together include all the data communications links of the network, each non-overlapping test level comprising two or more adjacent tiers of the tree. Locating hardware faults according to embodiments of the present invention typically also includes defining test cells within each non-overlapping test level, each test cell comprising a subtree of the tree including a subtree root compute node and all descendant compute nodes of the subtree root compute node within a non-overlapping test level. Locating hardware faults according to embodiments of the present invention typically also includes performing, separately on each set of non-overlapping test levels, an uplink test on all test cells in a set of non-overlapping test levels and performing, separately from the uplink tests and separately on each set of non-overlapping test levels, a downlink test on all test cells in a set of non-overlapping test levels.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
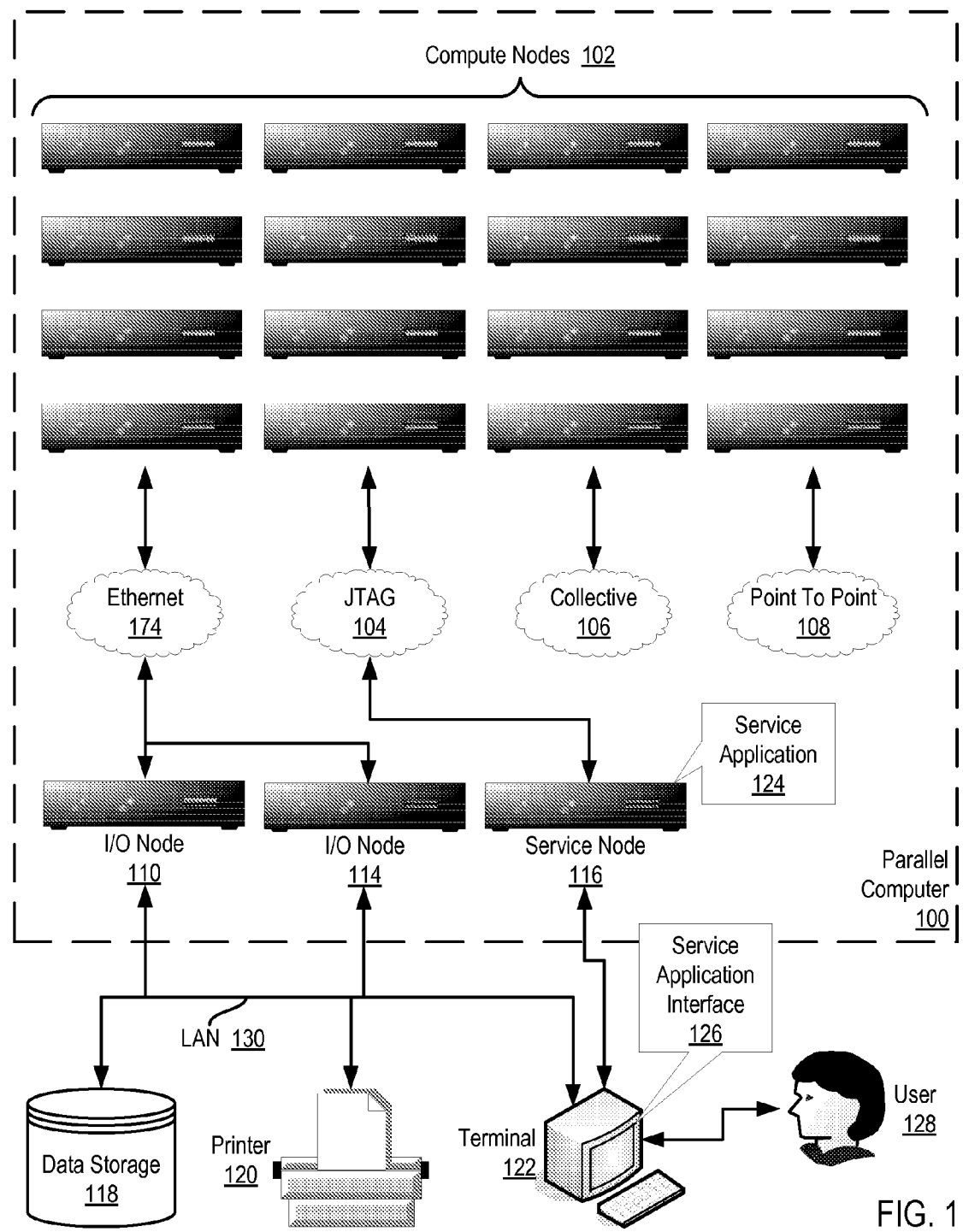
FIG. 1 illustrates an exemplary system for computer locating hardware faults in a parallel computer according to embodiments of the present invention.

Exemplary methods, apparatus, and computer program products for locating hardware faults in a parallel computer according to embodiments of the present invention are described with reference to the accompanying drawings, beginning with FIG. 1. FIG. 1 illustrates an exemplary system for locating hardware faults in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a collective operations network (106), and a point to point operations network (108). Collective operations network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. As described in more detail below in this specification, the system of FIG. 1 operates generally to locate hardware faults in a parallel computer according to embodiments of the present invention by defining within a tree network of a parallel computer two or more sets of non-overlapping test levels of compute nodes of the network that together include all the data communications links of the network, with each non-overlapping test level composed of two or more adjacent tiers of the tree; defining test cells within each non-overlapping test level, where each test cell includes a subtree of the tree which in turn includes a subtree root compute node and all descendant compute nodes of the subtree root compute node within a non-overlapping test level; performing, separately on each set of non-overlapping test levels, an uplink test on all test cells in a set of non-overlapping test levels; and performing, separately from the uplink tests and separately on each set of non-overlapping test levels, a downlink test on all test cells in a set of non-overlapping test levels.

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

Routing communications around a defective link may be part of a point to point operation or a collective operation, and the second network through which communications data is routed around a defective link may or may not be optimized for the operation in effect when the routing around occurs. If routing around a defective link occurs as part of a point to point operation in a network optimized for point to point operations, such as, for example, a torus, then the second network through which a data packet is routed around a defective link may be a network that is optimized for collective operations rather than point to point operations, such as, for example, a collective tree network. If routing around a defective link occurs as part of a collective operation in a network optimized for collective operations, such as, for example, a tree network, then the second network through which a data packet is routed around a defective link may be a network that is optimized for point to point rather than collective operations, such as, for example, a torus network.

A collective operation is an operation, a message-passing computer program instruction that is executed simultaneously, that is, at approximately the same time, by all the compute nodes in a 'plurality' or 'group' of compute nodes. Such a plurality or group of compute nodes may include all the compute nodes in the parallel computer (100) or a subset all the compute nodes. In MPI terminology, such a 'plurality' or 'group' may be defined as a 'communicator.'

'MPI' refers to 'Message Passing Interface,' a prior art parallel communications library, a module of computer program instructions for data communications on parallel computers. Examples of prior-art parallel communications libraries that may be improved for locating hardware faults in a parallel computer according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Collective operations are composed of many point to point messages executed more or less concurrently (depending on the operation and the internal algorithm) and involve all processes running in a given group of compute nodes, that is, in a given MPI communicator. Every process on every compute node in the group must call or execute the same collective operation at approximately the same time. The required simultaneity is described as approximate because many processes running on many separate, physical compute node cannot be said to do anything all together at exactly the same time. Parallel communications libraries provide functions to support synchronization. In the MPI example, such a synchronization function is a 'barrier' routine. To synchronize, all processes on all compute nodes in a group call MPI_barrier( ), for example, and then all processes wait until all processes reach the same point in execution. Then execution continues, with substantial synchronization.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gather from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

The arrangement of nodes, networks, and I/O devices making up the exemplary system illustrated in FIG. 1 are for explanation only, not for limitation of the present invention. Data processing systems capable of locating hardware faults in a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of locating hardware faults according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Locating hardware faults according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of locating hardware faults according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node.

Stored in RAM (156) is a diagnostic application program (158), a module of computer program instructions that carries out parallel, user-level data processing using parallel algorithms. Diagnostics application program (158) contains computer program instructions that operate, along with other programs on other compute nodes in a parallel computer, to locate hardware faults according to embodiments of the present invention by defining within a tree network of a parallel computer two or more sets of non-overlapping test levels of compute nodes of the network that together include all the data communications links of the network, with each non-overlapping test level composed of two or more adjacent tiers of the tree; defining test cells within each non-overlapping test level, where each test cell includes a subtree of the tree which in turn includes a subtree root compute node and all descendant compute nodes of the subtree root compute node within a non-overlapping test level; performing, separately on each set of non-overlapping test levels, an uplink test on all test cells in a set of non-overlapping test levels; and performing, separately from the uplink tests and separately on each set of non-overlapping test levels, a downlink test on all test cells in a set of non-overlapping test levels.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in locating hardware faults in a parallel computer according to embodiments of the present invention, using a traditional programming language such as the C programming language, and using traditional programming methods to write parallel communications routines that send and receive data among nodes on two independent data communications networks. Alternatively, existing prior art libraries may be used. Examples of prior-art parallel communications libraries that may be improved for locating hardware faults in a parallel computer according to embodiments of the present invention include the 'Message Passing Interface' ('MPI') library and the 'Parallel Virtual Machine' ('PVM') library. However it is developed, the parallel communications routines of parallel communication library (160) are improved to locate hardware faults according to embodiments of the present invention by defining within a tree network of a parallel computer two or more sets of non-overlapping test levels of compute nodes of the network that together include all the data communications links of the network, with each non-overlapping test level composed of two or more adjacent tiers of the tree; defining test cells within each non-overlapping test level, where each test cell includes a subtree of the tree which in turn includes a subtree root compute node and all descendant compute nodes of the subtree root compute node within a non-overlapping test level; performing, separately on each set of non-overlapping test levels, an uplink test on all test cells in a set of non-overlapping test levels; and performing, separately from the uplink tests and separately on each set of non-overlapping test levels, a downlink test on all test cells in a set of non-overlapping test levels.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex that those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
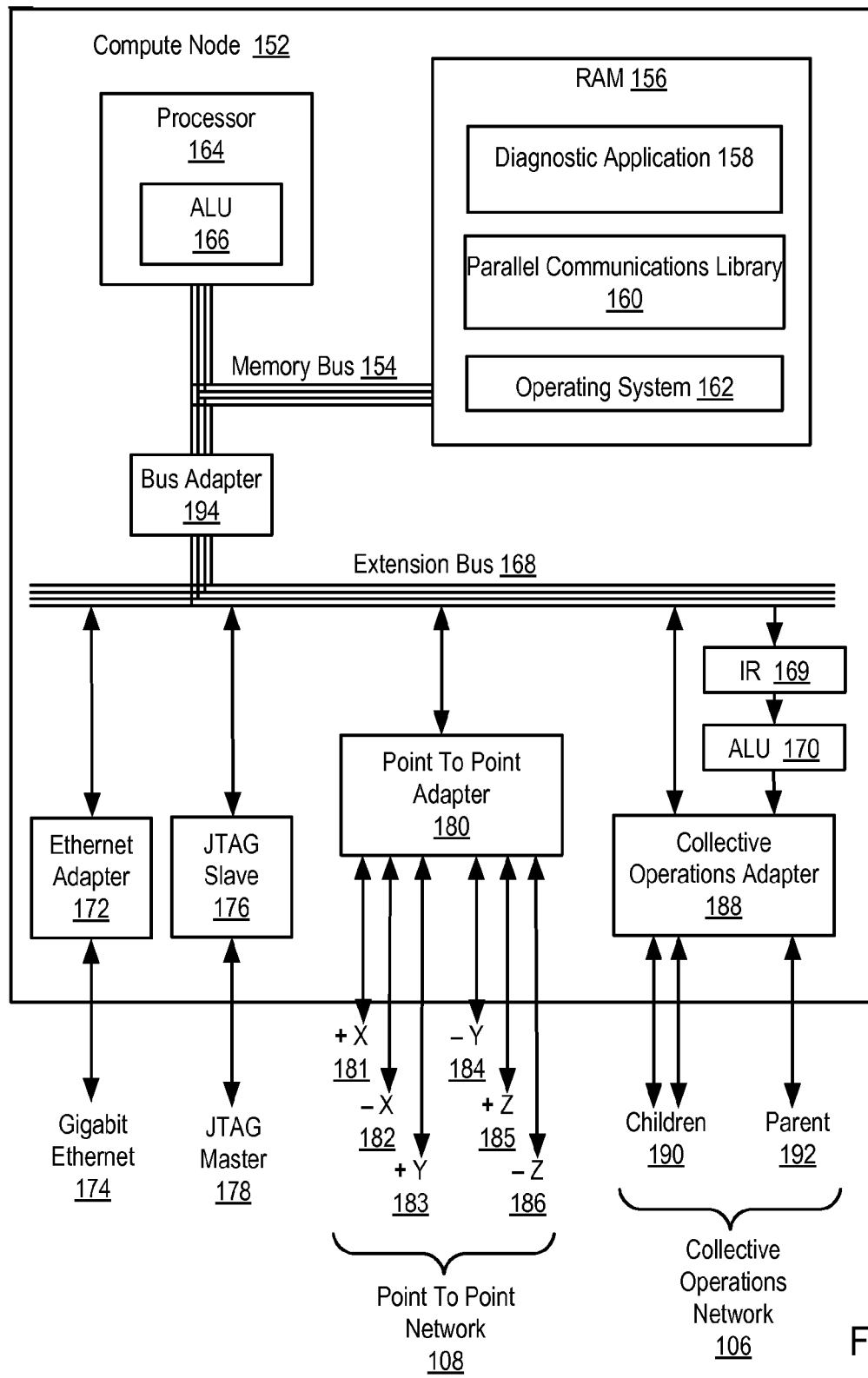
FIG. 2 sets forth a block diagram of an exemplary compute node useful in locating hardware faults in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that locate hardware faults according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in locating hardware faults according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Figure 3A:
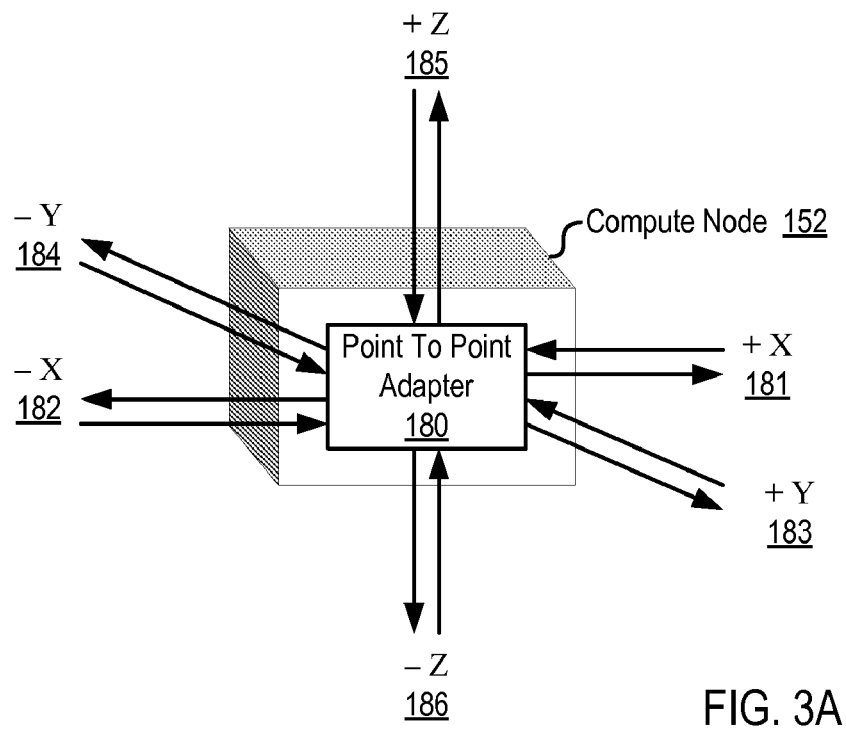
FIG. 3A illustrates an exemplary Point To Point Adapter useful in systems that locate hardware faults in a parallel computer according to embodiments of the present invention.

For further explanation, FIG. 3A illustrates an exemplary Point To Point Adapter (180) useful in systems that locate hardware faults according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
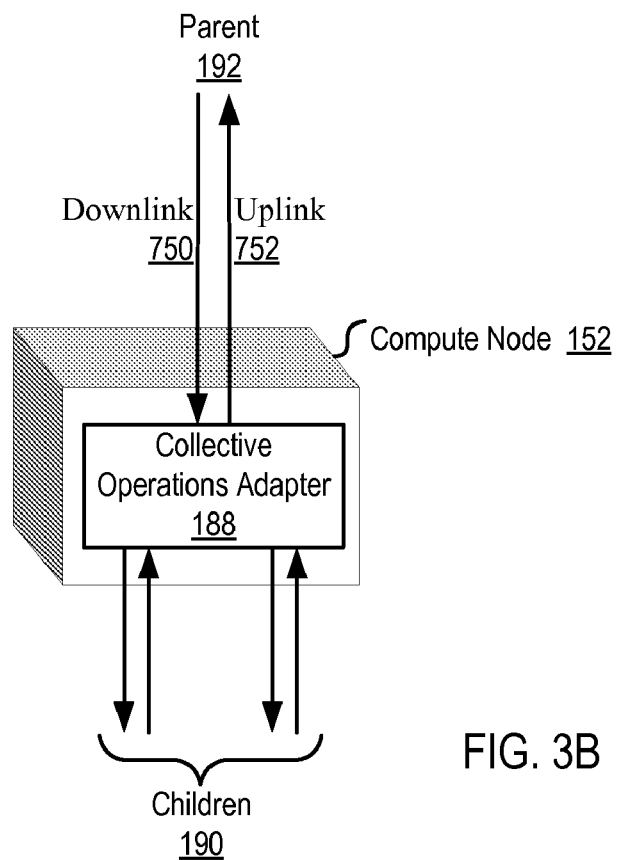
FIG. 3B illustrates an exemplary Collective Operations Adapter useful in systems that locate hardware faults in a parallel computer according to embodiments of the present invention.

For further explanation, FIG. 3B illustrates an exemplary Collective Operations Adapter (188) useful in systems that locate hardware faults according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
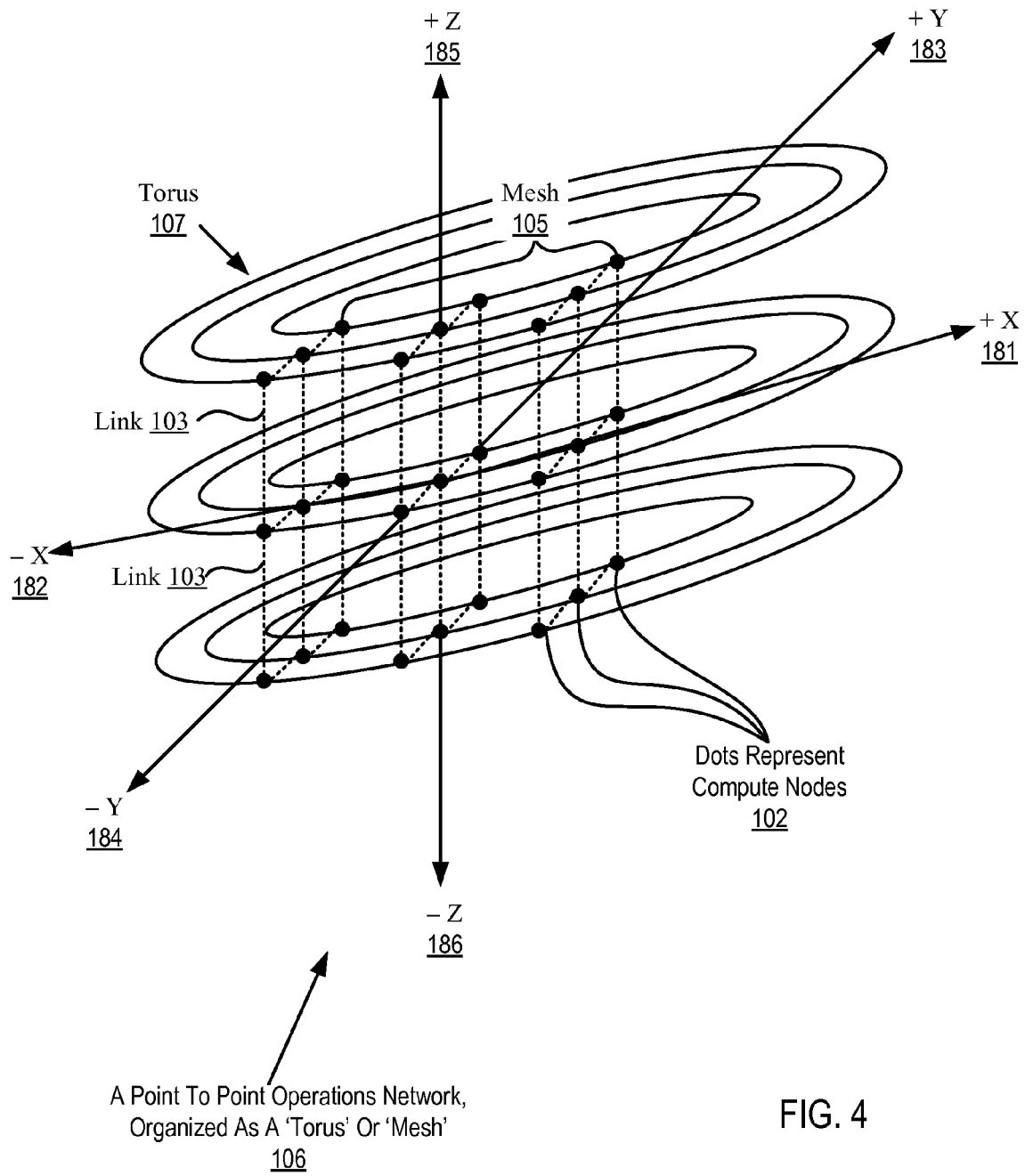
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in locating hardware faults in accordance with embodiments of the present invention may contain only a few compute nodes or may contain thousands of compute nodes.

Figure 5:
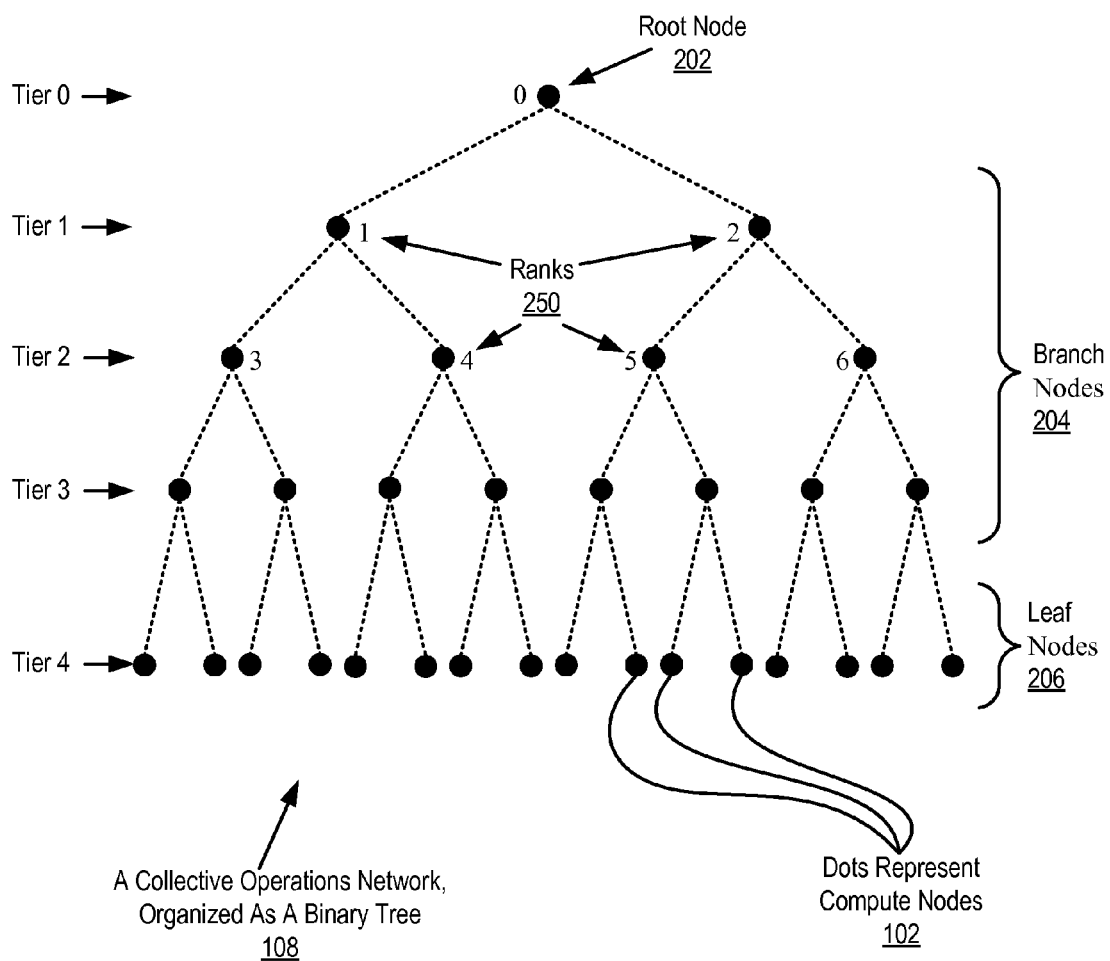
FIG. 5 illustrates an exemplary data communications network optimized for collective operations.

For further explanation, FIG. 5 illustrates an exemplary data communications network optimized for collective operations (108). The example data communications network of FIG. 5 includes compute nodes data communications links connected to the compute nodes so as to organize the compute nodes as a tree. In the example of FIG. 5, dots represent compute nodes (102) of a parallel computer, and the dotted lines between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in locating hardware faults in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the tree network (108) is characterized by a root compute node (202) and a plurality of tiers of compute nodes, Tier 0, Tier 1, and so on. The tiers of compute nodes are defined by the number of data communications links between the compute nodes of a tier and the root compute node (202). The compute node in Tier 0 has zero data communications links between the compute nodes in Tier 0 and the root node (202)—which is the only compute node in Tier 0. Each compute node in Tier 1 has one data communications link between it and the root node (202). Each compute node in Tier 2 has two data communications links between it and the root node (202). And so on.

The tiers of the network tree of FIG. 5 are numbered in integer sequence beginning with the tier containing the root node as Tier 0 and continuing with Tier 1, Tier 2, and so on. The fact that the tiers are numbered in integer sequence means that the tiers of compute nodes in the example of FIG. 5 include even-numbered tiers of compute nodes and odd-numbered tiers of compute nodes. Even-numbered tiers include Tier 0, Tier 2, and so on. Odd-numbered tiers include Tier 1, Tier 3, and so on.

Figure 6:
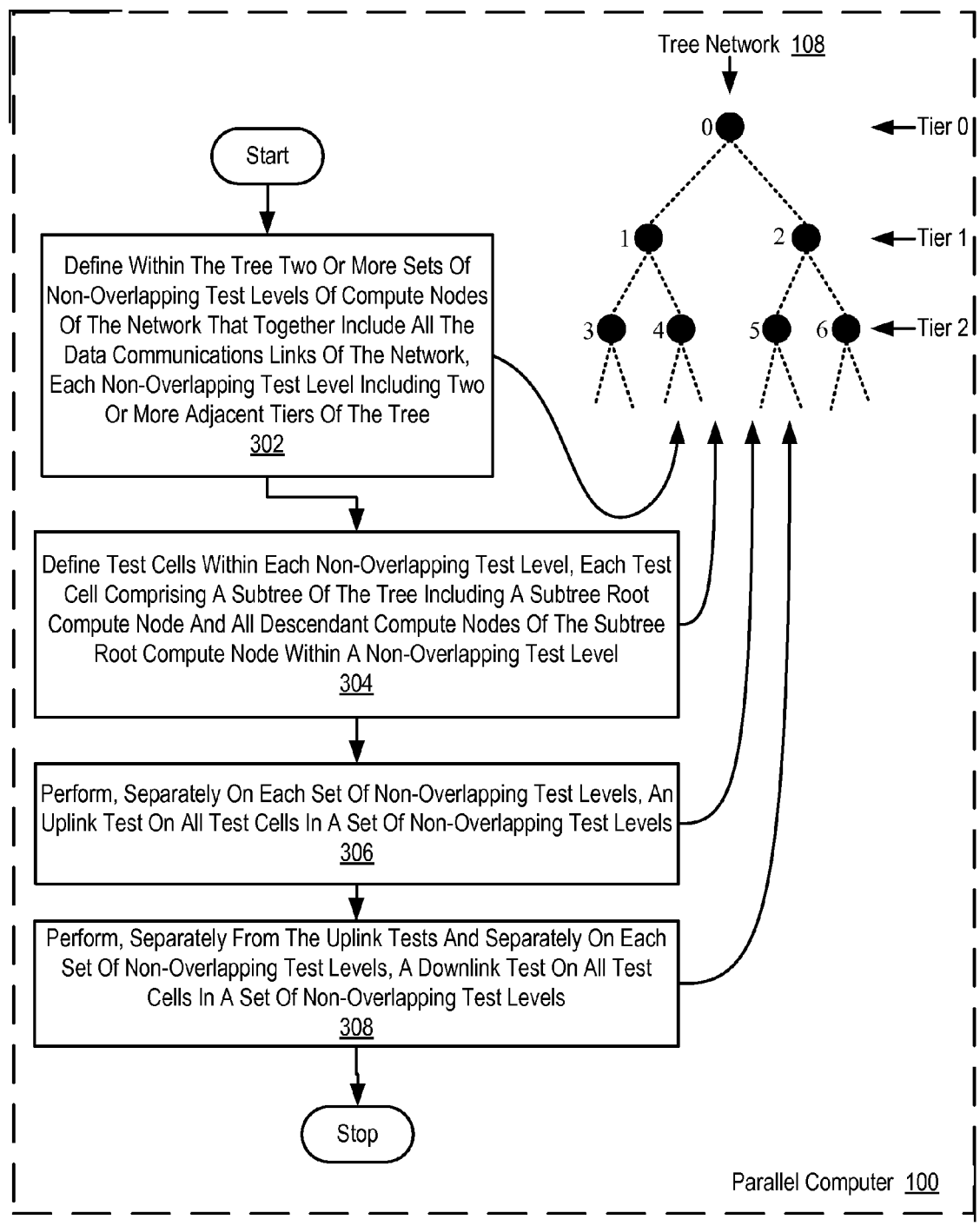
FIG. 6 sets forth a flow chart illustrating an exemplary method of locating hardware faults in a parallel computer according to embodiments of the present invention.

For further explanation, FIG. 6 sets forth a flow chart illustrating an exemplary method of locating hardware faults in a parallel computer according to embodiments of the present invention. The method of FIG. 6 is carried out in a parallel computer (100) that includes a plurality of compute nodes and a data communications network (108) that includes data communications links connected to the compute nodes so as to organize the compute nodes as a tree. The dots in FIG. 6 represent compute nodes, and the dotted lines between the dots represent data communications links among the compute nodes. Each compute node in FIG. 6 is illustrated with its rank, a numeric integer beginning with 0 and continuing through 6. The tree is characterized by a root compute node, the node with a rank of 0, and a plurality of tiers of compute nodes, Tier 0, Tier 1, and Tier 2. For ease of illustration, only the ranks of the first three tiers of the tree are shown here, but all compute nodes in the tree network are assigned a unique rank. For clarity of explanation, the data communications network (108) of FIG. 6 is illustrated with only six compute nodes and only three tiers, but readers will recognize that a data communications network organized as a tree for use in a parallel computer capable of locating hardware faults in accordance with embodiments of the present invention may contain any number of compute nodes and any number of tiers, only a few, or thousands.

Readers will notice that the tree network (108) illustrated in FIG. 6 is organized with a binary radix, a so-called binary tree, the root and each branch node having two children. The binary radix is used here, however, merely for ease of explanation, not as a limitation of the invention. In data communications networks of parallel computers that organize compute nodes in trees according to embodiments of the present invention, the root node and the branch nodes in such networks may have any number of child nodes as may occur to those of skill in the art. The term 'child' as used in this specification refers to immediate children of a parent node—not to grandchildren, great-grandchildren, and the like. The term 'descendants' as used in this specification refers to all children, grandchildren, great-grandchildren, and so on, of a parent node.

Figure 7A:
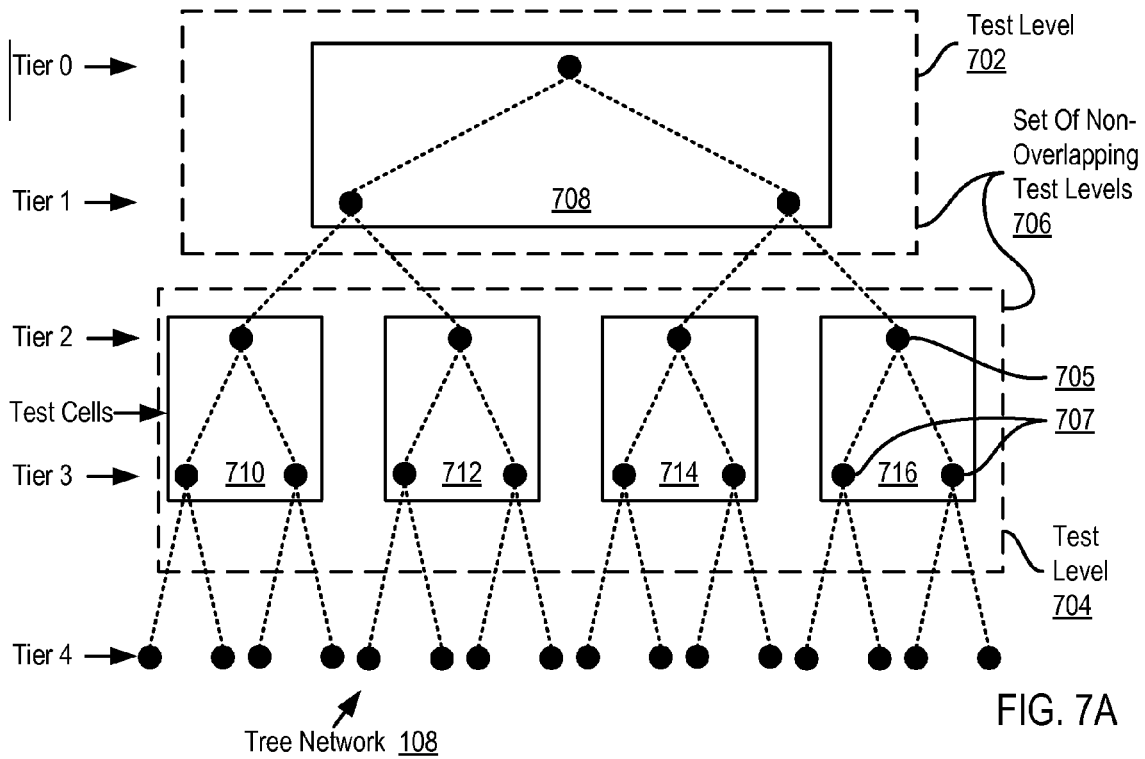
FIG. 7A illustrates a network organized as a tree in which there are defined a set of non-overlapping test levels of compute nodes.

The method of FIG. 6 includes defining (302) within the tree (108) two or more sets of non-overlapping test levels of compute nodes of the network that together include all the data communications links of the network, where each non-overlapping test level includes two or more adjacent tiers of the tree. FIG. 7A illustrates a network (108) organized as a tree in which there are defined a set of non-overlapping test levels (702, 704) of compute nodes where each non-overlapping test level (702, 704) includes two or more adjacent tiers of the tree. In FIG. 7A, dots represent compute nodes and dotted lines represent data communications links connected to the compute nodes so as to organize the compute nodes as a tree. Test level (702) includes two adjacent tiers of the tree, tier 0 and tier 1. Test level (704) includes two adjacent tiers of the tree, tier 2 and tier 3. Test levels (702, 704) are non-overlapping in that neither includes any data communications links that are also in the other. Test levels (702, 704) together represent a set (706) of non-overlapping test levels of compute nodes.

Figure 7B:
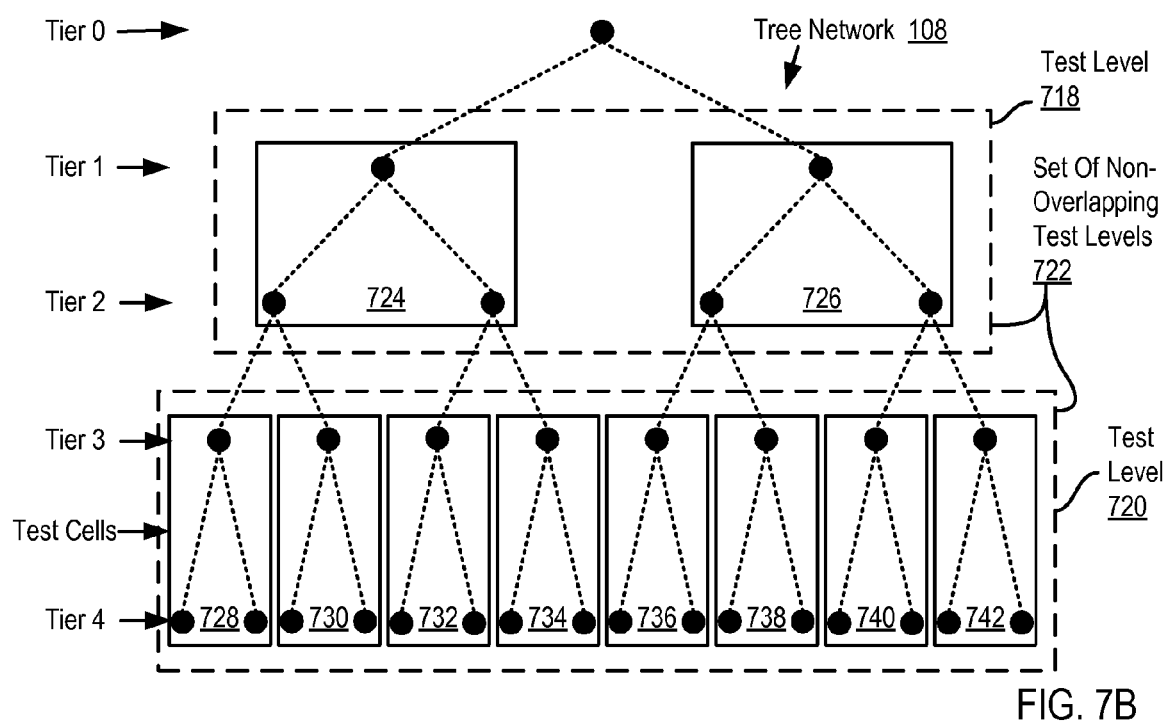
FIG. 7B illustrates the same network, but defined with a second set of non-overlapping test levels of compute nodes.

FIG. 7B illustrates the same network (108), this time defined with a second set of non-overlapping test levels (718, 720) of compute nodes where each non-overlapping test level (718, 720) includes two or more adjacent tiers of the tree. Test level (718) includes two adjacent tiers of the tree, tier 1 and tier 2. Test level (720) includes two adjacent tiers of the tree, tier 3 and tier 4. Test levels (718, 720) are non-overlapping in that neither includes any data communications links that are also in the other. Test levels (718, 720) together represent a set (722) of non-overlapping test levels of compute nodes. Test levels (702, 704, 718, 720) represent two sets (706, 722) of non-overlapping test levels of compute nodes of network (108) that together include all the data communications links of the network.

Referring again to FIG. 6: The method of FIG. 6 includes defining (304) test cells within each non-overlapping test level, where each test cell includes a subtree of the tree which in turn includes a subtree root compute node and all descendant compute nodes of the subtree root compute node within a non-overlapping test level. FIGS. 7A and 7B illustrate test cells defined within non-overlapping test levels. Non-overlapping test level (702) has defined within it test cell (708). Non-overlapping test level (704) has defined within it test cells (710, 712, 714, 716). Non-overlapping test level (718) has defined within it test cells (724, 726). And non-overlapping test level (720) has defined within it test cells (728, 730, 732, 734, 736, 738, 740, 742).

The reader's attention is directed to test cell (716) which is specially labeled with reference numbers for explanation. Like all the test cells in FIGS. 7A and 7B, test cell (716) is composed of three compute nodes representing a subtree of tree network (108). Test cell (716) contains a subtree root compute node (705) and a two branch nodes (707). The branch nodes (707) are the immediate children of subtree root compute node (705). The branch nodes (707) also are all the descendant compute nodes of the subtree root compute node (705) within non-overlapping test level (704). Similarly, test cells (710, 712, 714) each includes a subtree of the tree (108) which in turn includes a subtree root compute node and all descendant compute nodes of the subtree root compute node within non-overlapping test level (704). Test cell (708) includes a subtree of the tree (108) which in turn includes a subtree root compute node and all descendant compute nodes of the subtree root compute node within non-overlapping test level (702). Test cells (724, 726) each includes a subtree of the tree (108) which in turn includes a subtree root compute node and all descendant compute nodes of the subtree root compute node within non-overlapping test level (718). And test cells (728, 730, 732, 734, 736, 738, 740, 742) each includes a subtree of the tree (108) which in turn includes a subtree root compute node and all descendant compute nodes of the subtree root compute node within non-overlapping test level (720).

Referring again to FIG. 6: The method of FIG. 6 includes performing (306), separately on each set of non-overlapping test levels, an uplink test on all test cells in a set of non-overlapping test levels. That is, the uplink tests in this example are performed in two phases: First, again with reference to FIGS. 7A and 7B, an uplink test is performed on all the test cells in set of non-overlapping test levels (706). Second, a separate uplink test is performed on all the test cells in set of non-overlapping test levels (722).

The tree network of FIG. 7A presents an example of a set (706) of non-overlapping test levels in which each non-overlapping test level (702, 704) includes test cells having subtree root compute nodes in an even-numbered tier of compute nodes. Test level (702) includes test cells having subtree root compute nodes in Tier 0, and test level (704) includes test cells having subtree root compute nodes in Tier 2. Performing an uplink test on all test cells in a set of non-overlapping test levels in this example therefore is carried out by performing an uplink test on all test cells in a set of non-overlapping test levels in which each non-overlapping test level includes test cells having subtree root compute nodes in an even-numbered tier of compute nodes.

The tree network of FIG. 7B presents an example of a set (722) of non-overlapping test levels in which each non-overlapping test level (718, 720) includes test cells having subtree root compute nodes in an odd-numbered tier of compute nodes. Test level (718) includes test cells having subtree root compute nodes in Tier 1, and test level (720) includes test cells having subtree root compute nodes in Tier 3. Performing an uplink test on all test cells in a set of non-overlapping test levels in this example therefore is carried out by performing an uplink test on all test cells in a set of non-overlapping test levels in which each non-overlapping test level includes test cells having subtree root compute nodes in an odd-numbered tier of compute nodes.

In the method of FIG. 6, performing (306) an uplink test on test cells may be carried out by testing data communications links that transmit communications data in a direction from descendant compute nodes of a subtree root compute node toward the subtree root compute node. In the context of this discussion, 'up' refers to a direction of transmission from a descendant branch or leaf toward a parent or root node. Similarly, 'down' refers to a direction of transmission from a parent or root node toward a descendant of the parent or root. In the example of FIG. 3B, uplink (752) is a data communications link capable of transmitting communications data 'up,' that is, from a descendant branch or leaf toward a parent or root node. If compute node (152) is taken as a descendant compute node of a subtree root and its parent (192) is taken as a subtree root compute node like the one shown at reference (705) on FIG. 7A, then uplink (750) is a data communications link capable of transmitting communications data in a direction from descendant compute nodes of a subtree root compute node toward the subtree root compute node.

In the method of FIG. 6, performing (306) an uplink test may include testing an ALU of each subtree root compute node in all test cells in a set of non-overlapping test levels. Each compute node of tree (108), and therefore each subtree root compute node, may include a separate ALU dedicated performing the arithmetic and logical functions of reduction operations—such as, for example, the separate, dedicated ALU illustrated and described above with respect to reference (170) in FIG. 2. Testing an ALU of each subtree root compute node may be carried out by storing in the memory of each subtree root compute node a correct result of an MPI gather instruction that uses the ALU to execute an arithmetic or logical function, executing the gather, and comparing the results of the gather to the correct result.

The method of FIG. 6 also includes performing (308), separately from the uplink tests and separately on each set of non-overlapping test levels, a downlink test on all test cells in a set of non-overlapping test levels. That is, the downlink tests in this example are performed in two phases: First, again with reference to FIGS. 7A and 7B, a downlink test is performed on all the test cells in set of non-overlapping test levels (706). Second, a separate downlink test is performed on all the test cells in set of non-overlapping test levels (722). Performing the uplink tests and the downlink tests separately reduces the risk of a deadlock during test of a downlink, for example, when a related uplink is defective.

The tree network of FIG. 7A presents an example of a set (706) of non-overlapping test levels in which each non-overlapping test level (702, 704) includes test cells having subtree root compute nodes in an even-numbered tier of compute nodes. Test level (702) includes test cells having subtree root compute nodes in Tier 0, and test level (704) includes test cells having subtree root compute nodes in Tier 2. Performing a downlink test on all test cells in a set of non-overlapping test levels in this example therefore is carried out by performing a downlink test on all test cells in a set of non-overlapping test levels in which each non-overlapping test level includes test cells having subtree root compute nodes in an even-numbered tier of compute nodes.

The tree network of FIG. 7B presents an example of a set (722) of non-overlapping test levels in which each non-overlapping test level (718, 720) includes test cells having subtree root compute nodes in an odd-numbered tier of compute nodes. Test level (718) includes test cells having subtree root compute nodes in Tier 1, and test level (720) includes test cells having subtree root compute nodes in Tier 3. Performing a downlink test on all test cells in a set of non-overlapping test levels in this example therefore is carried out by performing a downlink test on all test cells in a set of non-overlapping test levels in which each non-overlapping test level includes test cells having subtree root compute nodes in an odd-numbered tier of compute nodes.

In the method of FIG. 6, performing (308) a downlink test on test cells may be carried out by testing data communications links that transmit communications data in a direction from a subtree root compute node toward descendant compute nodes of the subtree root compute node. In the example of FIG. 3B, downlink (750) is a data communications link capable of transmitting communications data 'down,' that is, from a parent or root node toward a descendant of the parent or root. If compute node is taken as a descendant compute node of a subtree root and its parent is taken as a subtree root compute node like the one shown at reference (705) on FIG. 7A, then downlink (750) is a data communications link capable of transmitting communications data in a direction from a subtree root compute node toward descendant compute nodes of the subtree root compute node. All the data communications links in tree network (108) may be bi-directions links composed of uplinks and downlinks like those (752, 750) illustrated and described with reference to FIG. 3B.

In the method of FIG. 6, performing (306) an uplink test may include testing ALUs of the descendant compute nodes of each subtree root compute node in all test cells in a set of non-overlapping test levels. Each compute node of tree (108), and therefore each descendant compute node of each subtree root compute node, may include a separate ALU dedicated performing the arithmetic and logical functions of reduction operations—such as, for example, the separate, dedicated ALU illustrated and described above with respect to reference (170) in FIG. 2. Testing ALUs of the descendant compute nodes may be carried out by storing in the memory of each descendant compute node a parameter value and a correct result of a parallel-computing broadcast instruction that uses the ALUs to execute an arithmetic or logical function on the parameter value and a broadcast value, executing the broadcast, and comparing the results of the broadcast to the correct result in each descendant compute node. The traditional MPI broadcast does not execute arithmetic or logical functions. The broadcast function in this example, therefore, is improved for use in locating hardware faults in a parallel computer according to embodiments of the present invention as shown here:

broadcast (void *buf, int count, Datatype dtype, int root, Op op, Comm comm);

In this broadcast operation, all compute nodes specify a subtree root compute node as the function 'root,' whose buffer contents will be sent and operated upon by the ALUs with the previously stored parameter value. Descendant compute nodes specify their receive buffers in the buffer pointer 'buf.' After the operation, all descendant compute nodes contain the results of the operation specified by 'op.' The operation can be any useful arithmetic or logical operation as may occur to those of skill in the art, sum, product, logical AND, logical OR, and so on.

Performing uplink and downlink tests on test cells has the benefit of immediately locating a hardware fault as being within a particular test cell when a defect is detected during a diagnostic run. Knowing that a hardware fault is in a particular test cell is a great benefit in parallel computing where a particular computer may contain thousands of compute nodes and thousands of data communications links. Performing uplink and downlink tests on sets of non-overlapping test levels provides a benefit: If a link in one test level is defective, the defective link cannot interfere with test operations in other test levels.

Because a downlink test is performed on test cells in a set of non-overlapping test levels of compute nodes in a parallel computer, a downlink test may be performed simultaneously on all test cells in a set of non-overlapping test levels. Performing downlink tests simultaneously on all test cells in a set of non-overlapping test levels provides a benefit: Each test requires a constant amount of time.

Exemplary embodiments of the present invention are described largely in the context of a fully functional computer system for locating hardware faults in a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of locating hardware faults in a parallel computer,
the parallel computer comprising a plurality of compute nodes and a data communications network that includes data communications links connected to the compute nodes so as to organize the compute nodes as a tree, the tree characterized by a root compute node and a plurality of tiers of compute nodes, the method comprising:
defining within the tree two or more sets of non-overlapping test levels of compute nodes of the network that together include all the data communications links of the network, each non-overlapping test level comprising two or more adjacent tiers of the tree;
defining test cells within each non-overlapping test level, each test cell comprising a subtree of the tree including a subtree root compute node and all descendant compute nodes of the subtree root compute node within a non-overlapping test level;
performing, separately on each set of non-overlapping test levels, an uplink test on all test cells in a set of non-overlapping test levels; and
performing, separately from the uplink tests and separately on each set of non-overlapping test levels, a downlink test on all test cells in a set of non-overlapping test levels.

2. The method of claim 1 wherein:
performing an uplink test on test cells further comprises testing data communications links that transmit communications data in a direction from descendant compute nodes of a subtree root compute node toward the subtree root compute node; and
performing a downlink test on test cells further comprises testing data communications links that transmit communications data in a direction from a subtree root compute node toward descendant compute nodes of the subtree root compute node.

3. The method of claim 1 wherein:
performing an uplink test further comprises testing an arithmetic logic unit ('ALU') of each subtree root compute node in all test cells in a set of non-overlapping test levels; and
performing a downlink test further comprises testing ALUs of the descendant compute nodes of each subtree root compute node in all test cells in a set of non-overlapping test levels.

4. The method of claim 1 wherein:
performing an uplink test further comprises performing an uplink test simultaneously on all test cells in a set of non-overlapping test levels; and
performing a downlink test further comprises performing a downlink test simultaneously on all test cells in a set of non-overlapping test levels.

5. The method of claim 1 wherein:
the tiers of compute nodes further comprise even-numbered tiers of compute nodes and odd-numbered tiers of compute nodes;
defining within the tree two or more sets of non-overlapping test levels of compute nodes of the network further comprises defining a set of non-overlapping test levels in which each non-overlapping test level comprises test cells having subtree root compute nodes in an even-numbered tier of compute nodes;
performing an uplink test on all test cells in a set of non-overlapping test levels further comprises performing an uplink test on all test cells in the set of non-overlapping test levels in which each non-overlapping test level comprises test cells having subtree root compute nodes in an even-numbered tier of compute nodes; and
performing a downlink test on all test cells in a set of non-overlapping test levels further comprises performing a downlink test on all test cells in the set of non-overlapping test levels in which each non-overlapping test level comprises test cells having subtree root compute nodes in an even-numbered tier of compute nodes.

6. The method of claim 1 wherein:
the tiers of compute nodes further comprise even-numbered tiers of compute nodes and odd-numbered tiers of compute nodes;
defining within the tree two or more sets of non-overlapping test levels of compute nodes of the network further comprises defining a set of non-overlapping test levels in which each non-overlapping test level comprises test cells having subtree root compute nodes in an odd-numbered tier of compute nodes;
performing an uplink test on nil test cells in a set of non-overlapping test levels further comprises performing an uplink test on all test cells in the set of non-overlapping test levels in which each non-overlapping test level comprises test cells having subtree root compute nodes in an odd-numbered tier of compute nodes; and performing a downlink test on all test cells in a set of non-overlapping test levels further comprises performing a downlink test on all test cells in the set of non-overlapping test levels in which each non-overlapping test level comprises test cells having subtree root compute nodes in an odd-numbered tier of compute nodes.

7. A parallel computer comprising a plurality of compute nodes and a data communications network that includes data communications links connected to the compute nodes so as to organize the compute nodes as a tree, the tree characterized by a root compute node and a plurality of tiers of compute nodes, the parallel computer further comprising a computer processor, a computer memory operatively coupled to the computer processor, the computer memory having disposed within it computer program instructions capable of:

defining within the tree two or more sets of non-overlapping test levels of compute nodes of the network that together include all the data communications links of the network, each non-overlapping test level comprising two or more adjacent tiers of the tree;

defining test cells within each non-overlapping test level, each test cell comprising a subtree of the tree including a subtree root compute node and all descendant compute nodes of the subtree root compute node within a non-overlapping test level;

performing, separately on each set of non-overlapping test levels, an uplink test on all test cells in a set of non-overlapping test levels; and performing, separately from the uplink tests and separately on each set of non-overlapping test levels, a downlink test on all test cells in a set of non-overlapping test levels.

8. The parallel computer of claim 7 wherein:

performing an uplink test on test cells further comprises testing data communications links that transmit communications data in a direction from descendant compute nodes of a subtree root compute node toward the subtree root compute node; and performing a downlink test on test cells further comprises testing data communications links that transmit communications data in a direction from a subtree root compute node toward descendant compute nodes of the subtree root compute node.

9. The parallel computer of claim 7 wherein:

performing an uplink test further comprises testing an arithmetic logic unit ('ALU') of each subtree root compute node in all test cells in a set of non-overlapping test levels; and performing a downlink test further comprises testing ALUs of the descendant compute nodes of each subtree root compute node in all test cells in a set of non-overlapping test levels.

10. The parallel computer of claim 7 wherein:

performing an uplink test further comprises performing an uplink test simultaneously on all test cells in a set of non-overlapping test levels; and performing a downlink test further comprises performing a downlink test simultaneously on all test cells in a set of non-overlapping test levels.

11. The parallel computer of claim 7 wherein:

the tiers of compute nodes further comprise even-numbered tiers of compute nodes and odd-numbered tiers of compute nodes;

defining within the tree two or more sets of non-overlapping test levels of compute nodes of the network further comprises defining a set of non-overlapping test levels in which each non-overlapping test level comprises test cells having subtree root compute nodes in an even-numbered tier of compute nodes;

performing an uplink test on all test cells in a set of non-overlapping test levels further comprises performing an uplink test on all test cells in the set of non-overlapping test levels in which each non-overlapping test level comprises test cells having subtree root compute nodes in an even-numbered tier of compute nodes; and performing a downlink test on all test cells in a set of non-overlapping test levels further comprises performing a downlink test on all test cells in the set of non-overlapping test levels in which each non-overlapping test level comprises test cells having subtree root compute nodes in an even-numbered tier of compute nodes.

12. The parallel computer of claim 7 wherein:

the tiers of compute nodes further comprise even-numbered tiers of compute nodes and odd-numbered tiers of compute nodes;

defining within the tree two or more sets of non-overlapping test levels of compute nodes of the network further comprises defining a set of non-overlapping test levels in which each non-overlapping test level comprises test cells having subtree root compute nodes in an odd-numbered tier of compute nodes;

performing an uplink test on all test cells in a set of non-overlapping test levels further comprises performing an uplink test on all test cells in the set of non-overlapping test levels in which each non-overlapping test level comprises test cells having subtree root compute nodes in an odd-numbered tier of compute nodes; and performing a downlink test on all test cells in a set of non-overlapping test levels further comprises performing a downlink test on all test cells in the set of non-overlapping test levels in which each non-overlapping test level comprises test cells having subtree root compute nodes in an odd-numbered tier of compute nodes.

13. A computer program product for locating hardware faults in a parallel computer, the parallel computer comprising a plurality of compute nodes and a data communications network that includes data communications links connected to the compute nodes so as to organize the compute nodes as a tree, the tree characterized by a root compute node and a plurality of tiers of compute nodes, the computer program product disposed upon a computer-readable recordable medium, the computer program product comprising computer program instructions which, when executed by a computer, are capable of causing the computer to perform the steps of:

defining within the tree two or more sets of non-overlapping test levels of compute nodes of the network that together include all the data communications links of the network, each non-overlapping test level comprising two or more adjacent tiers of the tree;

defining test cells within each non-overlapping test level, each test cell comprising a subtree of the tree including a subtree root compute node and all descendant compute nodes of the subtree root compute node within a non-overlapping test level;

performing, separately on each set of non-overlapping test levels, an uplink test on all test cells in a set of non-overlapping test levels; and performing, separately from the uplink tests and separately on each set of non-overlapping test levels, a downlink test on all test cells in a set of non-overlapping test levels.

14. The computer program product of claim 13 wherein:
performing an uplink test on test cells further comprises testing data communications links that transmit communications data in a direction from descendant compute nodes of a subtree root compute node toward the subtree root compute node; and
performing a downlink test on test cells further comprises testing data communications links that transmit communications data in a direction from a subtree root compute node toward descendant compute nodes of the subtree root compute node.

15. The computer program product of claim 13 wherein:
performing an uplink test further comprises testing an arithmetic logic unit ('ALU') of each subtree root compute node in all test cells in a set of non-overlapping test levels; and
performing a downlink test further comprises testing ALUs of the descendant compute nodes of each subtree root compute node in all test cells in a set of non-overlapping test levels.

16. The computer program product of claim 13 wherein:
performing an uplink test further comprises performing an uplink test simultaneously on all test cells in a set of non-overlapping test levels; and
performing a downlink test further comprises performing a downlink test simultaneously on all test cells in a set of non-overlapping test levels.

17. The computer program product of claim 13 wherein:
the tiers of compute nodes further comprise even-numbered tiers of compute nodes and odd-numbered tiers of compute nodes;
defining within the tree two or more sets of non-overlapping test levels of compute nodes of the network further comprises defining a set of non-overlapping test levels in which each non-overlapping test level comprises test cells having subtree root compute nodes in an even-numbered tier of compute nodes;
performing an uplink test on all test cells in a set of non-overlapping test levels further comprises performing an uplink test on all test cells in the set of non-overlapping test levels in which each non-overlapping test level comprises test cells having subtree root compute nodes in an even-numbered tier of compute nodes; and
performing a downlink test on all test cells in a set of non-overlapping test levels further comprises performing a downlink test on all test cells in the set of non-overlapping test levels in which each non-overlapping test level comprises test cells having subtree root compute nodes in an even-numbered tier of compute nodes.

18. The computer program product of claim 13 wherein:
the tiers of compute nodes further comprise even-numbered tiers of compute nodes and odd-numbered tiers of compute nodes;
defining within the tree two or more sets of non-overlapping test levels of compute nodes of the network further comprises defining a set of non-overlapping test levels in which each non-overlapping test level comprises test cells having subtree root compute nodes in an odd-numbered tier of compute nodes;
performing an uplink test on all test cells in a set of non-overlapping test levels further comprises performing an uplink test on all test cells in the set of non-overlapping test levels in which each non-overlapping test level comprises test cells having subtree root compute nodes in an odd-numbered tier of compute nodes; and
performing a downlink test on all test cells in a set of non-overlapping test levels further comprises performing a downlink test on all test cells in the set of non-overlapping test levels in which each non-overlapping test level comprises test cells having subtree root compute nodes in an odd-numbered tier of compute nodes.

\* \* \* \* \*